United States Patent [19]

White et al.

[11] Patent Number: 5,649,894

[45] Date of Patent: Jul. 22, 1997

[54] COMPOSITIONS AND METHODS FOR WASTE TREATMENT

[75] Inventors: Timothy John White, 3 Mirani Court, West Lakes Shore, South Australia, 5020; James Hamilton Kyle, 60 St Leonard's Avenue, Leederville, Western Australia, 6007; Gregory Francis Eaton, Crawley, all of Australia

[73] Assignees: James Hamilton Kyle, Leederville; Timothy John White, West Lakes Shore, both of Australia

[21] Appl. No.: 403,924

[22] PCT Filed: Sep. 21, 1993

[86] PCT No.: PCT/AU93/00489

§ 371 Date: May 1, 1995

§ 102(e) Date: May 1, 1995

[87] PCT Pub. No.: WO94/06575

PCT Pub. Date: Mar. 31, 1995

[30] Foreign Application Priority Data

Sep. 22, 1992 [AU] Australia ................... PL4837
Jul. 21, 1993 [AU] Australia ................... PM0074

[51] Int. Cl.⁶ ............... A62D 3/00; B09B 3/00; G21F 9/00

[52] U.S. Cl. ............... 588/256; 106/697; 588/19; 588/252; 588/259; 405/128

[58] Field of Search ............... 588/19, 234, 252, 588/256, 257, 259; 106/697; 405/128; 501/155

[56] References Cited

U.S. PATENT DOCUMENTS

| | | | |
|---|---|---|---|
| 3,954,661 | 5/1976 | Kilian | 588/19 |
| 4,303,477 | 12/1981 | Schmidt et al. | 588/234 X |
| 4,921,538 | 5/1990 | Lafser, Jr. et al. | 501/155 X |
| 5,132,246 | 7/1992 | Brisson et al. | 501/155 X |
| 5,220,112 | 6/1993 | Bucci et al. | 588/256 |
| 5,245,121 | 9/1993 | Gall et al. | 588/257 |
| 5,288,434 | 2/1994 | Brewer et al. | 588/19 |
| 5,347,073 | 9/1994 | Hochleitner et al. | 588/256 |

*Primary Examiner*—George A. Suchfield
*Attorney, Agent, or Firm*—Amster, Rothstein & Ebenstein

[57] ABSTRACT

Methods for waste treatment and compositions of stabilized waste elements are provided, typically for the disposal of arsenical wastes. Arsenic trioxide waste produced as a by-product of metal extraction is slurried in water for from 6 to 24 hours with finely divided quicklime to produce nonvolatile calcium arsenate (III). An excess of CaO stoichiometry with As is used to consume secondary waste species such as sulphate, silicate and iron oxides. The precipitated arsenate is oven dried at 120° C. and then calcined in air between 15 minutes to several hours at 1000° C. to 500° C. respectively to oxidize arsenate (III) to arsenate (V) as $Ca_5(AsO_4)_3(OH)$ (an apatite) as the major arsenic immobilization phase, with minor arsenic incorporated in $Ca_3(AsO_4)_2$. Calcium sulphate anhydrate (sulphate immobilization) and calcium iron oxide (iron immobilization) are also produced. Tertiary immobilization is achieved milling or fracturing and incorporating the apatite an encapsulant consisting of ordinary portland cement and flyash. After curing for one month in steel drums in a water saturated atmosphere, the waste form is ready to be transported either to a repository or to used as landfill. Further security may be achieved at the back end of the process by lining the repository with ferric clays that will strongly absorb and adsorb heavy metal species which may escape.

20 Claims, 3 Drawing Sheets

5,649,894

1

COMPOSITIONS AND METHODS FOR WASTE TREATMENT

BACKGROUND OF THE INVENTION

This invention relates to compositions and methods of waste treatment.

This invention has particular but not exclusive application to compositions and methods for immobilizing heavy metal and metalloid wastes in a form suitable for geological disposal, and for illustrative purposes reference will be made to such application. However, it is to be understood that this invention could be used in other applications, such as stabilization of other metallic waste streams.

Metal and metalloid waste streams often contain metal salts which are highly toxic or form toxic oxyanions. For example, arsenic containing waste streams present a significant toxic hazard in land fill or the like due to the high leachability of arsenates (III) and the III and V state oxides of arsenic. In the past it has been proposed to immobilize arsenic containing waste materials by encapsulation in portland cement. The arsenic oxides thus encapsulated are of variable oxidation state and generally comprise a mixture of compounds with arsenic in the III and V states. It has been proposed to treat the waste stream with $H_2O_2$ or other oxidizing agents to oxidize arsenic III to less soluble and less toxic arsenic V.

A typical waste stream containing high levels of arsenic is the waste produced by metal extraction from ores or concentrates of arsenopyrites. In general, condensed arsenic oxides are produced by pyrometallurgical processes and are precipitated from a condensed gas stream. It has been proposed to mix the oxide directly with aqueous portland cement slurry and cure the mixture in (generally) mild steel containment or directly into fill or into other containment. The disadvantages of this process relates to the instability of the compositions to certain conditions encountered in land fill disposal, including susceptibility to leaching at low and high pH, and poor mechanical properties. Such compositions typically have compressive strengths of about 10 MPa at an equivalent $As_2O_3$ loading of 50 wt % compared with a strength of 20 MPa for portland cement per se when mixed with an equivalent amount of clean building sand. Where the aforedescribed $H_2O_2$ oxidation process is used to reduce the solubility of %he incorporated waste, the process becomes uneconomic.

Other prior art proposed methods for arsenic waste stream treatment include mixing arsenic III–V oxides with an excess, generally between 3000 to 5000 mol %, of slaked lime $Ca(OH)_2$ in water slurry to form generally insoluble calcium arsenate (III) and calcium arsenate (V) precipitates having a general formula $Ca_x(AsO_4)_n$. However, the precipitates have proven to be of variable leachability, probably due to the presence of a proportion of soluble compounds including arsenic III compounds. Also, the compositions are acid labile particularly with respect to $CO_2$ or carbonates in the presence of groundwater or water vapour.

Additionally, acidic arsenic III–V oxide containing waste streams have been mixed with 200 or more mole % of ferric (oxy hydroxide), then adjusted to pH 5 to pH 8 with slaked lime in water to form ferric oxyarsenic compounds comprising mixed arsenate (III) and arsenate (V). Again these compositions are acid labile although less than $Ca_x(AsO_4)_n$, and are subject to leaching in the presence of carbonate and/or bicarbonate and water.

Both of the foregoing processes are only useful for treatment of waste streams containing metals or metalloids forming oxyanions such as arsenic.

2

In general the prior art processes do not produce a "volume reduced" waste stream, that is, the prior art processes do not generally result in relatively dense stabilised waste products incorporating the waste species high mole percentages by weight. In addition, they do form thermodynamically stable mineral structures.

The existence of proportions of volatile arsenic compounds in arsenic waste streams has generally prevented the use of calcining processes for incorporation of such wastes in thermodynamically stable mineral structures.

The present invention aims to substantially alleviate least one of the above disadvantages and to provide compositions and methods of waste treatment which will be reliable and efficient in use. Other objects and advantages of this invention will hereinafter become apparent.

SUMMARY OF THE INVENTION

With the foregoing and other objects in view, this invention in one aspect resides broadly in a method of waste stabilization comprising the steps of:

forming an oxide of a metal or metalloid component of said waste stream;

slurrying the oxide containing waste stream with an inorganic base or an inorganic oxyacid selected to form an insoluble precipitate with said oxide, and calcining said precipitate.

Preferably, the calcined precipitate has the metal or metalloid incorporated in its most stable oxidation stare. Preferably, the calcined precipitate comprises a stable mineral structure selected from one or more apatite, pyrochlore $(A_{1-2}B_2O_{6-7})$, perovskite $(ABO_3)$, hollandite $(A_{1-2}B_8O_{16})$ or other stable form having its metal or metalloid components in their highest stable oxidation state. For example, for many heavy metals such as lead or metalloids such as arsenic, an apatite mineral structure is stable and preferred. Accordingly, in a further aspect this invention resides broadly in a method of stabilizing oxide wastes of metals or metalloids including the steps of:

slurrying the waste material with a metal halide and a compound selected from an inorganic base or an oxyacid, said compound being selected such that a non-volatile metalloid oxyanion halide salt or a non volatile metal halo-oxyanion salt is formed respectively, and calcining said slurry to form an apatite crystal structure or an analogue thereof.

DETAILED DESCRIPTION OF THE PREFERRED EMBODIMENTS

Figure 1:
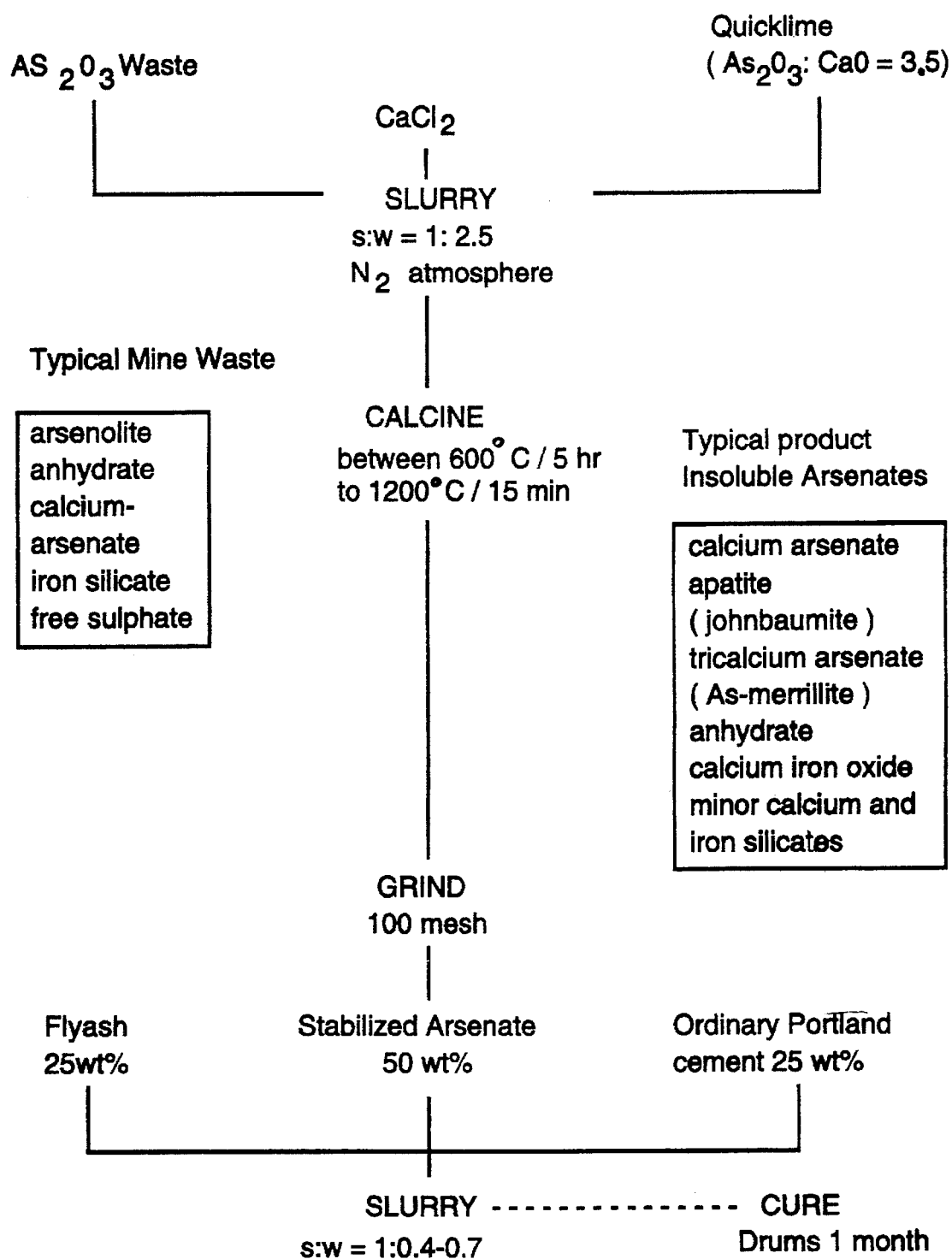
FIG. 1 shows the flow sheet for immobilization of arsenic trioxide derived during gold mining operations in accordance with the process of the present invention.

In the foregoing context and hereinafter, the term "metalloid oxide" includes oxides of hazardous elements, metalloids and metals which form oxyanions, such as arsenic, vanadium, sulphur, phosphorus, manganese and chromium. "Metal oxide" in the present context and hereinafter includes oxides of hazardous heavy metals which are capable of forming relatively insoluble salts. Members of the latter group may also fall within the former. The term "non-volatile" in the context of the non-volatile metalloid oxyanion halide salt or a non volatile metal halo-oxyanion salt relates to the compounds having very low vapour pressures at the temperatures typically encountered during the calcining process.

"Apatite structure" in the present context is taken to be in accordance with the definition of M. O'Keeffe and B. G. Hyde. Although precise, the definition admits of small variations in structure and composition that will be expected in dealing with complex waste stream apatites. The structure is regarded as an anion-stuffed alloy. The alloy part has the topology of the type $Mn_5Si_3(D8_8)$. For example in fluoroapatite $Ca_5(PO_4)_3F$, the $Ca_5P_3$ cation array is identical to the $Mn_5Si_3$ type. The anions are then stuffed into the appropriate, usually tetrahedral interstices formed by the regular array of cations. Thus, all the oxygens forming the $PO_4$ tetrahedra are in $PCa_3$ tetrahedra of two types. The F sits in a $Ca_3$ triangle (in hydroxyapatite the O is in a $Ca_3H$ tetrahedra, while in chlorapatite the chlorine is near the centre of a $Ca_6$ octahedron). This description also readily explains the replacement of $PO_4^{3-}$ phosphate groups by $CO_3^{2-}$ carbonate groups and $SO_4^{2-}$ sulphate groups as well as instances on cationic non stoichiometry. Conversely, apatite structures having the general formula $A_5(BO_4)_3X$ may show substitution or deviation in stoichiometry of the anions X and/or cations A.

Preferably, the process is adapted to the processing of cadmium, mercury and/or lead metal oxide wastes and arsenic, chromium, vanadium and/or selenium metalloid oxide wastes. Preferably, the slurrying step of processes in accordance with the present invention results in the production of one or both of two coexisting insoluble compounds. One has the general formula $A_5(BO_4)_3X$ where A=calcium, cadmium, mercury or lead, B=phosphorous, arsenic, chromium, vanadium, sulphur, carbon, silicon or selenium and X=fluorine, chlorine or hydroxyl. The other has the general formula $A_3(BO_4)_2$. In the case of metals or metalloids such as arsenic, vanadium and chromium which form the anion radicals arsenate, vanadate or chromate the process involves reaction with an inorganic base, preferably CaO to promote the formation of non volatile $Ca_3(BO_4)_2$ compounds. In the case of other heavy metal waste streams which are compatible with this form of processing for example, barium wastes, zinc wastes, mercury wastes and cadmium wastes, the process involves reaction with an inorganic oxyacid, preferably $H_3PO_4$. In all cases, the waste forms are preferably tailored to ensure the crystallographic entrapment of the metals in highly insoluble apatites of the form $A_5(PO_4)_3X$ or analogous minerals.

Preferably, the strong inorganic base is selected from the alkaline earth basic oxides such as calcium oxide for processing of metalloid oxide wastes such as arsenic oxide containing wastes. For example, for processing wastes containing a predominance of arsenic oxide compounds, the waste may be slurried with water and inorganic base to provide a predominance of nonvolatile alkaline earth metal arsenates (III). Preferably the base is utilized in excess of stoichiometry to ensure the conversion to non volatile arsenates (III) and arsenates (V). Preferably, for arsenic waste treatment the alkaline earth or transition metal halide is selected from chlorides and fluorides to form non-volatile metal arsenate, the slurrying being preferably conducted in the absence of acid species such as $CO_2$ to maximize production of non volatile arsenate (III) compounds.

Preferably, the inorganic oxyacid is selected from the phosphorus oxyacids. In instances where mixed wastes are to be processed, it may be desirable to combine the preferable lime and phosphoric acid processes. Alternatively, waste streams may be deliberately mixed to provide blended wastes treatable by combined lime and phosphoric acid procedures.

In practice it has Dean determined that for treatment of arsenical wastes to stable arsenate compounds, the commercial viability of the process may be determined by the reaction rate of the waste stream with the inorganic base, preferably CaO. It has been found that suitable reaction rates may be achieved by control of the slurrying temperature and control of the surface area and hence reactivity of the lime. The lime may be selected to be of surface area of greater than 0.5 $m^2/g$ and is preferably in the range 1.0 $m^2/g$ to greater than 2.0 $m^2/g$. Such preferred reactivities may be produced, for example by moderate burning of calcium carbonate, overburning generally reducing the surface area to below 0.5 $m^2/g$. Highly reactive limes may be produced by, for example, flash calcining of calcium carbonate to limes having surface areas of about 2.0 $m^2/g$.

Temperature control is particularly appropriate when dealing with waste streams including a predominance of $As_2O_3$, since the availability of the arsenic oxide for reaction is determined by its dissolution characteristics in aqueous media. In the case of arsenic oxide, the reaction kinetics is dominated by the variation of solubility of the oxide with temperature and hence availability of oxide for reaction with the lime. Whereas arsenic oxide is slightly soluble (<1 mg/l) at 30° C., solubility increases to 30 mg/l at 60° C. and 85 mg/l at 90° C.

Additionally it has been determined that concurrent addition of alkaline salts of light metals such as sodium and potassium to the slurry/hydrometallurgical stage results in more rapid reaction rates. Rapid reaction rates are achieved by increasing the solubility of the reactant by production of a reactive intermediate. The reaction of the intermediate in accordance with the foregoing results in regeneration of the alkaline salts. Preferably, the alkaline salt is selected from NaOH and/or KOH. The supernatant containing the alkaline salt in solution may be recycled after the precipitated arsenates are removed by filtration or centrifugation.

Preferably, the metal halide is selected from transition metal halides in the case of metal oxide wastes, and is selected from alkaline earth metal halides in respect of metalloid oxide wastes. Alternatively, the halide may be sourced from a halide donor such as $H_2SiF_6$, wherein a portion of the oxyanions of the apatites of the formula $A_5(BO_4)_3X$ may be substituted by a proportion of residual $SiO_4$ anions. Preferably, metal halide salts such as calcium fluoride or calcium chloride are incorporated on the basis of well established crystallochemical principles to produce fluorine or chlorine chemical forms of the $A_5(BO_4)_3X$ compounds.

Preferably the insoluble precipitate of non volatile intermediates is calcined under conditions con, rolled to maximize the production of insoluble mineral compounds of an apatite or other stable structure. If desired the precipitate may be dewatered or dried prior to calcining.

Preferably, relatively pure water is used in the hydrometallurgical slurrying process. For example, distilled and/or demineralised water is preferably used. In remote localities, distilled water may produced from ground water using vacuum distillation or reverse osmosis. The water is preferably recycled from the dewatering of the precipitate, oven drying and/or calcination stages.

Whilst apatite structures are preferred, some waste elements are not amenable to apatite immobilization. In these cases, a polyphase collection of compounds may be required to stabilise the components of a waste stream. For example, antimony V will be stabilised as $A_{1-2}B_2O_{7-x}X_x$ pyrochlore type structures. Thallium I may be stabilised in $A_{1-2}B_8O_{16}$ hollandite type. Thorium will be stabilised as $ThP_2O_7$. A summary of the preferred principal host phase for various toxic metals is give in Table 1 below. These phases are preferably chosen because they are mutually compatible and can be prepared under similar, oxidizing conditions. The summary does not exclude the possibility of some waste elements partitioning between two or more phases and indeed such complexity is expected, and may be beneficial in accommodating compositional variations in a given waste stream.

TABLE 1

| Structure Type | Waste Element |
| --- | --- |
| $A_5(BO_4)_3X$ apatite | A = Ca,Pb,Cd,Hg,Ba,Sr, Lanthanides, Actinides; B = P,As,Cr,V,Si,Se; x = F,Cl,Br,I,OH |
| $A_{1-2}B_2O_{7-x}X_x$ pyrochlore | A = Ca,Sr,Pb,Cd,Ba,Sr, Lanthanides, Actinides; B = Sb,Ti,V,Cr,Se; X = F,Cl,Br,I,OH,NH$_4$ |
| $A_{1-2}B_8O_{16}$ hollandite | A = Tl,Hg,alkali, alkali earth B = transition metals |
| $ABO_3$ perovskite | A = alkali, alkali earths, lanthanides, actinides; B = transition metals |

The calcined precipitate may be physically consolidated in cementitious materials that will facilitate transport of the waste form to its ultimate disposal site. Selection of the insoluble compound and cementitious substance will be determined with reference to the geochemical characteristics of the landfill or other environmental conditions of disposal. For example, the calcine may be cosolidified with cementitious materials including ordinary portland cement, high alumina elements and magnesia cements. A consideration in selection of the cementitious material is the mechanical strength of the solidified product, which may be determined by the waste loading of the aggregate. Preferably, the cementitious barrier is selected with the disposal environment in mind. For example, in acidic soils ordinary portland cement is stable and may be selected for use as the solidification medium. In basic soils, magnesia and/or alumina based cements may be used.

If desired, a proportion of the cementitious material may be replaced with pozzolanic flyash. This provides additional advantages on the consolidated waste material by consuming another cheap waste material and providing enhanced immobilization properties such as higher density, less porosity and greater resistance to attack by sulphate and chloride.

Processes in accordance with the present invention may be executed as batch or continuous processes. For example, continuous processing may be most appropriate for large, central facilities. Mixing and blending may be integrated and be followed successively with a filtering step and a consolidation/extrusion step. The consolidation/extrusion step may yield either bricks or aggregate. Where extrusion is to be used, it may be desirable to mix the filtered product with either a water soluble or alcohol soluble polymer or bentonite clay to optimize the plastic properties of the powder. The aggregate/bricks may then be fed either a rotary kiln or belt kiln.

Batch processing may be most appropriate for a small mobile unit that would service small sites requiring remediation. In this case, bricking may be the preferred option, followed by tray calcination in a box kiln.

Figure 2:
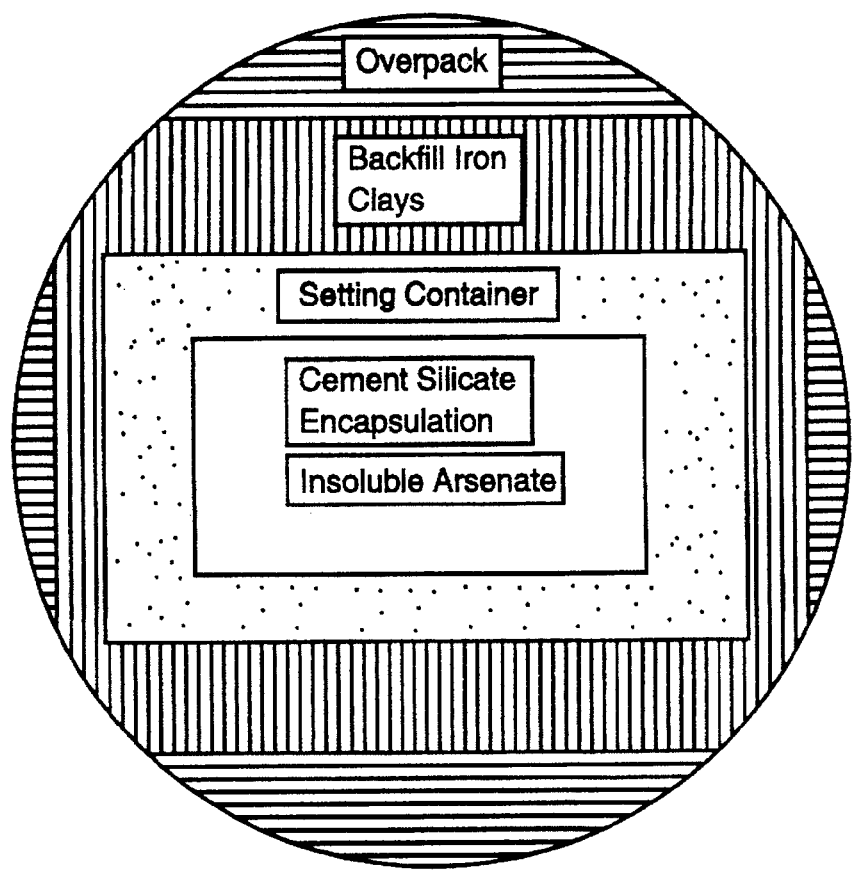
FIG. 2 shows the various levels of the multibarrier concept as applied to the disposal of arsenic trioxide in accordance with the present invention.
Figure 3:
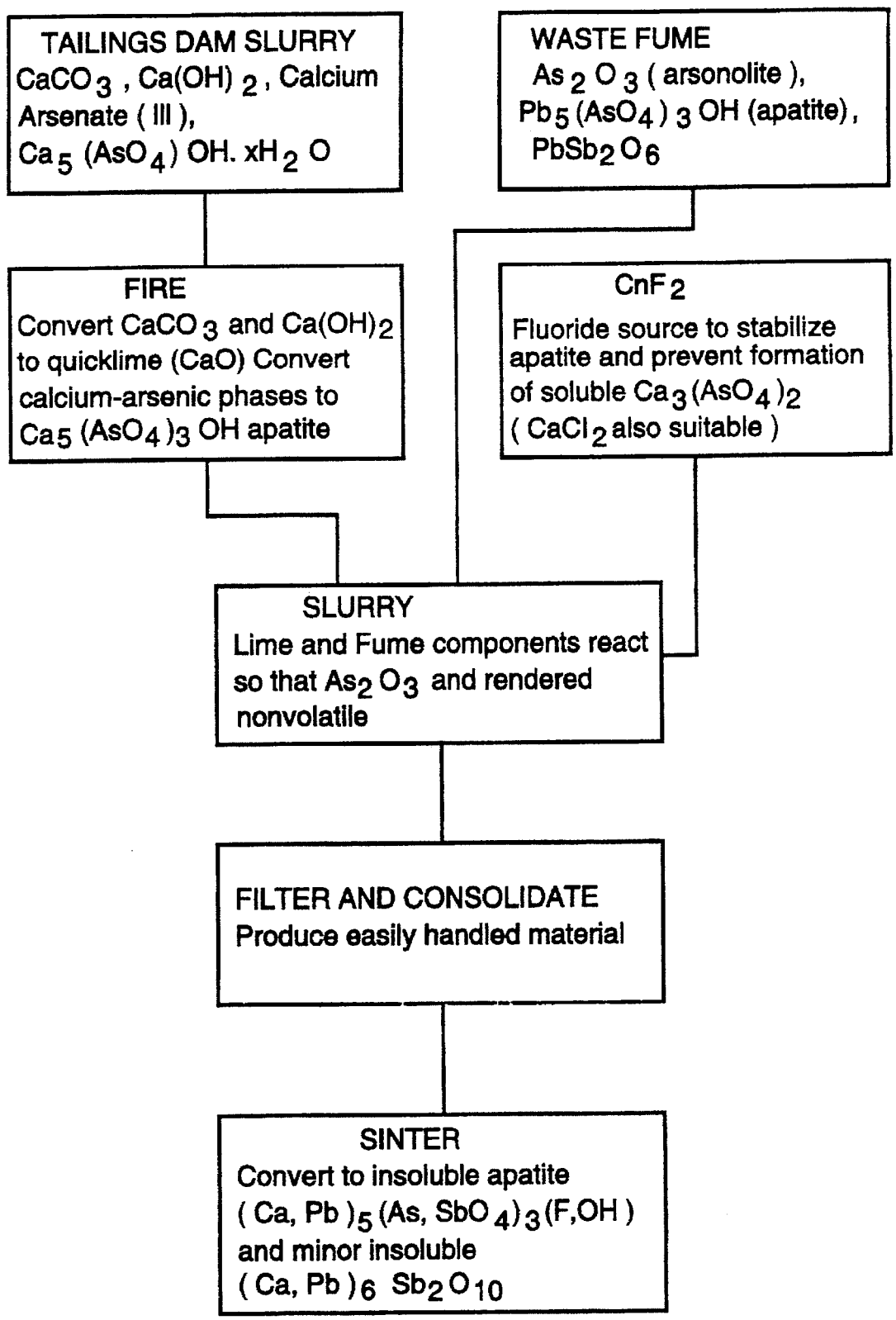
FIG. 3 illustrates a flow sheet for the preparation of such a waste form.

In order that this invention may be more readily understood and put into practical effect, reference will now be made to the following examples and accompanying drawings which illustrate a preferred embodiment of the invention and wherein:

FIG. 1 shows the flow sheet for immobilization of arsenic trioxide derived during gold mining operations in accordance with the process of the present invention;

FIG. 2 shows the various levels of the multibarrier concept as applied to the disposal of arsenic trioxide in accordance with the present invention;

FIG. 3 illustrates a glow sheet for the preparation of such a waste form.

Figure 4:
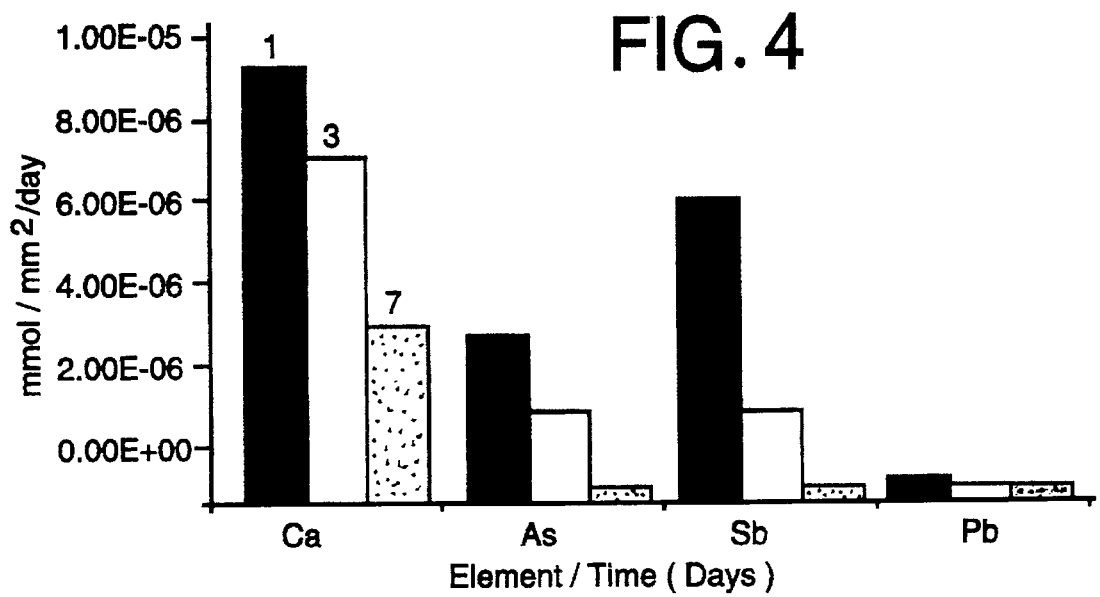
FIG. 4 comprises leach data in respect of stabilized waste forms produced in accordance with the present invention.

FIG. 4 comprises leach data in respect of stabilized waste forms produced in accordance with the present invention.

EXAMPLE 1

In one embodiment of this invention, arsenic trioxide waste produced as a by-product of precious metal extraction was slurried in water with a quantity in excess of stoichiometric of finely divided (approximately 50 micrometer particle size) quicklime to produce nonvolatile calcium arsenate (III). As such wastes invariably contain lesser quantities of sulphate, silicate and iron oxides, sufficient excess quicklime is added to consume these secondary waste species. A slurry time of from 6 to 24 hours is sufficient for the reaction to be completed, depending on the reactivity of the quicklime. After slurrying, the product was oven dried at 120° C. with negligible loss of arsenic in the condensates and then calcined in air.

A range of calcination times and temperatures were conducted on the dewatered precipitate, ranging from 15° minutes at 1000° C. to several hours at 500° C. During firing the arsenate (III) is oxidized to arsenate (V), which promotes the formation of $Ca_5(AsO_4)_3(OH)$ as the major arsenic immobilization phase, with minor arsenic incorporated in $Ca_3(AsO_4)_2$. Secondary waste species were crystallized as calcium anhydrate (sulphate immobilization) and calcium iron oxide (iron immobilization).

Referring to FIG. 1 it can be seen that the primary hydrometallurgical reaction involves slurrying the arsenic trioxide waste with quicklime in the ratio As2O3:CaO=3:5 to produce nonvolatile calcium arsenate (III). Because the mine waste contains compounds other than arsenic Trioxide additional lime must be added in preferably stoichiometric proportions to ensure stabilization of these minor species. In the secondary calcination process, the slurry is fired for the temperatures and times shown so that the oxidation occurs and apatite is produced.

Tertiary immobilization is achieved by dividing the apatite by milling or fracturing, which is biologically safe, and incorporating the apatite in a cementitious encapsulant consisting of ordinary portland cement and flyash, with or without fume silica as a porosity and strength modifier. This is achieved by slurrying the apatite-cement mixture in water in a solids:water (s:w) ratio of 1:0.4–0.7. After curing for one month in steel drums in a water saturated atmosphere, the waste form is ready to be transported either to a repository or to used as landfill. Further security may be achieved at the back end of the process by lining the repository with material (eg ferric clays) that will strongly absorb and adsorb heavy metal species which may escape.

FIG. 2 illustrates schematically a multibarrier waste immobilization regime as applied to calcium arsenate (v) apatite. The first level of immobilization is by crystallization in the apatite. Additional stabilization is achieved by encapsulation of the insoluble compounds by a stable cementitious matrix which will inhibit dissolution. Should any portion of the arsenic dissolve it will be rapidly adsorbed by iron Clays which will trap the arsenic and retard its dispersion into the biosphere.

EXAMPLE 2

Arsenious waste from a base metal extraction is frequently placed in temporary storage in tailings dams. To minimise the concentration of solubilized arsenic in such dams an excess of lime is usually added to precipitate the waste as a calcium arsenate (III). These railings dam slurries cannot be directly converted to an apatite because lime would be left in excess. The presence of a substantial excess of lime is unsatisfactory as during hydration and through carbonation the lime swells and destroys the physical integrity of the waste form.

To overcome this problem, the slurry is blended with arsenic rich fume collected by precipitation in quantities just sufficient to consume the excess lime. The fume may contain lead and antimony in addition to arsenic. In addition, $CaF_2$ and/or $CaCl_2$ are added to stabilise the halo-apatite. The final apatite therefore would be rich in arsenic and lead, and contain minor antimony. The majority of the antimony partitions into a $(Ca,Pb)_{1-1.5}Sb_2O_{7-x}(F,Cl,OH)_x$ phase. FIG. 3 illustrates, in the form of a flow sheet, a waste stabilization process in accordance with this embodiment. FIG. 4 illustrates leach data obtained in a dynamic boiling water leach test carried out over a total of 11 days in respect of the apatite product of the process in accordance with this embodiment.

EXAMPLE 3

"BIOX" is a commercial biohydrometallurgical process for The recovery of gold from refractory sulphide ores. This process involves the bacterial oxidation of pyrite/arsenopyrite sulphide concentrates to produce a liquor phase containing arsenic (V), ferric and sulphate ions. according to the general equations:

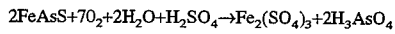

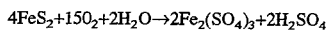

The process can also be achieved by high pressures and temperatures without biological mediation.

To convert this waste to solid, the waste solution is first mixed with dilute phosphoric acid to precipitate the iron as iron orthophosphate and hence reduce the concentration of iron in the waste stream.

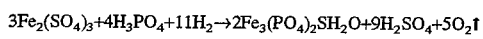

The remaining liquor of $H_3AsO_4$ and sulphuric acid is filtered and the reacted with quicklime and calcium fluoride $CaF_2$ in stoichiometric quantity to yield arsenic (V) apatite and gypsum (calcium sulphate)

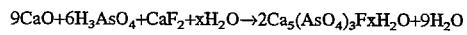

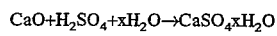

This material is then dewatered and calcined in the usual way to remove water of crystallization to yield apatite and anhydrate and consolidate the product.

EXAMPLE 4

The procedure may be used to stabilise mercury wastes generated from mercurial fungicides including phenyl mercuric acetate (PMA, "TAG"*), methoxyethyl mercuric chloride and methoxyethyl mercury silicate ("CERESAN"* in Europe), ethyl metcurio chloride (Ceresan* in the U.S.), hydroxy mercury chlorophenol ("SEMESAN"*), hydroxy mercury nitrophenol ("SEMESAN BEL"*) and methyl metcurio dicyandiamide ("PANAGEN"*). In this embodiment the mercury is liberated as an oxide by catalytic photooxidation of the mercurial using ultraviolet light of wavelength 180 nm. Finely divided sodium oxide and/or titania may be required to catalyze the reaction. The mercury oxide residue is slurried with dilute hydrophosphoric acid and fluorite in stoichiometric proportions to yield a compound possessing an apatite type crystal structure and having the chemical composition $(Hg_9Ca)(PO_4)_6F_2$. This material is dewatered at 120° C. and then preferably

*Registered Trade Mark consolidated prior to firing at temperatures of up to 600° C.

EXAMPLE 5

In the case of mercuric chloride $HgCl_2$ the waste is slurried with lime and phosphoric acid in stoichiometric proportions to yield an apatite of composition $(HgCa_9)(PO_4)_6Cl_2$. This compound is dried as before, consolidated and the fired at temperatures not exceeding 1000° C.

EXAMPLE 6

Organic arsenical herbicides including the monosodium (MSMA) and disodium (DSMA) salts of methane arsenic acid, and cacodylic acid may also liberate arsenic oxide by catalytic photooxidation. The arsenic oxide can then be treated in the usual way.

EXAMPLE 7

Inorganic arsenic insecticides including lead arsenate $PbHAsO_4$ and calcium arsenate $Ca_3(AsO_4)_2$ and $CaHAsO_4$ can be treated to produce apatites of the type $(Ca_xPb_{1-x})(AsO_4)_3(F,Cl)$.

EXAMPLE 8

Sulphate containing vanadium pentoxide spent catalysts are a waste generated during petroleum refining and sulphuric acid manufacture. These may be processed in accordance with the present invention to a two phase assemblage of an apatite $(Ca)(V,PO_4)_3(F,Cl)$ and anhydrate $CaSO_4$, by slurrying with lime and/or phosphoric acid and a halide salt in stoichiometric quantity. Firing is preferably to 1100° C.

EXAMPLE 9

The jarosite family of compounds $MFe_3(SO_4)_2(OH)_6$ where M=M, Na, K, $NH_4$, Ag, Pb are used as means of iron precipitation in zinc processing. The jarosites may also contain many heavy metals such as Pb, As, Cd and Hg. Jarosite is only stable at low pH(<3.2) and so these heavy metals may be released by raising the pH using a suitable base. The solubilised metals can then be concentrated by evaporation prior to treatment with lime and phosphoric acid in accordance with the present invention.

EXAMPLE 10

Copper-chrome-arsenate (CCA) wood preservatives consist of the compounds copper sulphate ($CuSO_4 5H_2O$), sodium dichromate ($Na_2Cr_2O_7 2H_2O$) and arsenic pentoxide ($As_2O_5 2H_2O$). Waste CCA may be treated by reaction with sufficient lime and halide salt to form apatites of the form $CaS(CrO_4)_3(F,Cl)$ and $Ca_5(AsO_4)_3(F,Cl)$ and Scheele's green $CuHAsO_3$. Sodium is removed by washing.

EXAMPLE 11

Iodine-129 is a long lived fission product generated during consumption of nuclear fuel. It is also highly volatile. It can be readily collected as a condensate in the off gas stream during dissolution and/or reprocessing of fuel rods. In this form it may be dissolved in dilute phosphoric acid and reacted with lead oxide to produce an apatite of composition $Pb_8(PO_4)_5I$.

EXAMPLE 12

In another embodiment, lead bearing waste from sugar refining and having the formula $NaPb_2(CO_3)_2OH$ was mixed with a stoichiometric quantity of dilute orthophosphoric acid to produce highly insoluble $Pb_5(PO_4)_3(OH)$ that was separated from the $NaHCO_3$ residual solution by filtering. The $Pb_5(PO_4)_3(OH)$ containing precipitate was then oven dried at 120° C. The dry product was calcined in air at about 400° C. to remove organic materials such as residual sugars.

EXAMPLE 13

Whist apatite structures are preferred, some waste elements are not amenable to apatite immobilization. In this embodiment, radioactive wastes from sand mining containing high concentrations of thorium are digested in concentrated sulphuric acid, followed by treatment with phosphoric acid to yield $ThP_2O_7$, which is stable and insoluble.

EXAMPLE 14

Waste containing greater than 5 wt % antimony oxide cannot be stabilised all as apatite, but the excess antimony may be stabilized in an apatite compatible phase as a pyrochlore structure $Ca_2Sb_2O_{7-x}(F,Cl,OH)_x$.

The foregoing procedures yield a waste form/phase assemblage whose dissolution characteristics are less than current regulatory limits and which provides effective immobilization of the heavy metals and metalloids over geological times. The wastes are volume reduced, the density of the disposal material being in the region of 3 to 7 g/cc depending upon the waste stream composition. When incorporated in portland cement, the strength of the aggregate of clinker and fractured clinker is about 20 MPa.

The preferred multibarrier treatment involves various barriers to prevent the movement of heavy metal species away from the waste site. The three barriers are the immobilization in an apatite phase, the crystallochemical barrier provided by the cementitious material and the geological barrier provided by the burial site. These three barrier levels may be selected in an integrated fashion so that a heavy metal immobilization system is designed whose reliability can be guaranteed over geological times. For example, in the case of the arsenic mine waste, 50 wt % of apatite could be consolidated with 25 wt % ordinary Portland cement and 25 wt % pozzolanic flyash. The waste form would have good mechanical strength (15 MPa) and be stable in an acidic geological setting.

A landfill of such geology could be excavated and lined with an iron bearing clay which would strongly absorb minor arsenate that may dissolve from the waste form itself. Thus losses from arsenic from the near-field (waste form itself) and the far-field (liner and overpack) would be extremely low over extended times.

Further, since immobilization is provided according to well established chemical principles, the intrinsic long term leach resistance of the primary crystallochemical barrier can be determined. No other available technology offers this level of security, since immobilization technologies utilizing hitherto uncharacterized immobilization forms have unpredictable long term performance.

It will of course be realised that while the above has been given by way of illustrative example of this invention, all such and other modifications and variations thereto as would be apparent to persons skilled in the art are deemed to fall within the broad scope and ambit of this invention as defined in the claims appended hereto.

We claim:

1. A method of waste stabilization comprising the steps of:
   forming an oxide of a metal or metalloid component of said waste stream;
   slurrying the oxide containing waste stream with an inorganic base or an inorganic oxyacid selected to form an insoluble precipitate with said oxide, and
   calcining said precipitate.

2. A method of waste stabilization according to claim 1, wherein said calcined precipitate comprises a stable mineral structure selected from the group consisting of apatite, pyrochlore, hollandite, perovskite and mixtures thereof.

3. A method of stabilizing oxide wastes of metals or metalloids including the steps of:
   slurrying the waste material with a halide donor and a compound selected from the group consisting of an inorganic base and an oxyacid, said compound being selected such that a non-volatile metalloid oxyanion halide salt or a non-volatile metal halo-oxyanion salt is formed, respectively, and
   calcining said slurry to form an apatite crystal structure or an analogue thereof.

4. A method of stabilizing oxide wastes according to claim 3, wherein said metalloid oxide includes oxides of hazardous elements, metalloids and metals which form oxyanions.

5. A method of stabilizing oxide wastes according to claim 4, wherein said metalloid is arsenic.

6. A method of stabilizing oxide wastes according to claim 3, wherein said metal oxide includes oxides of hazardous heavy metals which are capable of forming relatively insoluble salts.

7. A method of stabilizing oxide wastes according to claim 6, wherein said metal is selected from cadmium, mercury and lead.

8. A method of stabilizing oxide wastes according claim 3, wherein said calcined precipitate includes one or more of the minerals of general formulae $A_5(BO_4)_3X$ and $A_3(BO_4)_2$, where A=calcium, cadmium, mercury or lead, B=phosphorous, arsenic, chromium, vanadium, sulphur, carbon, silicon or selenium and X=fluorine, chlorine or hydroxyl.

9. A method of stabilizing oxide wastes according to claim 3, wherein said strong inorganic base is selected from the alkaline earth basic oxides.

10. A method of stabilizing oxide wastes according to claim 9, wherein safe oxide waste includes arsenic oxide containing waste, and wherein said inorganic base is calcium oxide.

11. A method of stabilizing oxide wastes according claim 10, wherein the surface area of said calcium oxide is selected to be in the range 1.0 $m^2/g$ to greater than 2.0 $m^2/g$.

12. A method of stabilizing oxide wastes according to claim 3, wherein said inorganic oxyacid is selected from the phosphorus oxyacids.

13. A method of stabilizing oxide wastes according to claim 3, wherein said halide donor is selected from transition metal halides in the case of metal oxide wastes, and is selected from alkaline earth metal halides in respect of metalloid oxide wastes.

14. A method of stabilizing oxide wastes according to claim 3, wherein said halide donor comprises $H_2SiF_6$ such that said calcined precipitate comprises an apatite mineral of general formula $A_5(BO_4)_3F$ wherein A=calcium, cadmium, mercury or lead, and B=phosphorous, arsenic, chromium, vanadium, sulphur, carbon, silicon or selenium, and wherein a portion of the oxyanions of the apatite are substituted by a proportion of residual $SiO_4$ anions.

15. A method of stabilizing oxide wastes according to claim 3, wherein said calcined precipitate is further physically consolidated in cementitious materials.

16. A method of stabilizing oxide wastes according to claim 15, wherein said calcine is cosolidified with cementitious materials selected from portland cement, high alumina cements and magnesia cements.

17. A method of stabilizing oxide wastes according to claim 16, wherein a proportion of said cementitious material is replaced with pozzolanic flyash.

18. A method of waste stabilization according to claim 1, wherein said waste comprises radioactive wastes from sand mining containing high concentrations of thorium compounds, and including the steps of:

digesting the waste with concentrated sulphuric acid to fully oxidize said thorium compounds to said oxide;

treating the digested waste with phosphoric acid to precipitate $ThP_2O_7$;

dewatering the precipitated $ThP_2O_7$; and calcining said precipitate.

19. Calcined mineral compounds and compositions comprising one or more of the minerals of the general formulae $A_5 (BO_4)_3X$ and $A_3 (BO_4)_2$, where A=calcium, cadmium, mercury or lead, B=phosphorous, arsenic, chromium, vanadium, sulphur, carbon silicon or selenium, and X=fluorine, chlorine or hydroxyl, produced by the method of claim 1.

20. Calcined mineral compounds and compositions comprising one or more of the minerals of the general formulae $A_5 (BO_4)_3X$ and $A_3 (BO_4)_2$, where A=calcium, cadmium, mercury or lead, B=phosphorous, arsenic, chromium, vanadium, sulphur, carbon silicon or selenium, and X=fluorine, chlorine or hydroxyl, produced by the method of claim 18.

* * * * *